(12) United States Patent
Ralli

(10) Patent No.: US 10,918,084 B2
(45) Date of Patent: Feb. 16, 2021

(54) CHEMICAL APPLICATOR FOR A PET DOOR

(71) Applicant: Rohit Ralli, Turramurra (AU)

(72) Inventor: Rohit Ralli, Turramurra (AU)

( * ) Notice: Subject to any disclaimer, the term of this patent is extended or adjusted under 35 U.S.C. 154(b) by 216 days.

(21) Appl. No.: 15/760,151

(22) PCT Filed: Sep. 16, 2016

(86) PCT No.: PCT/AU2016/050871
§ 371 (c)(1),
(2) Date: Mar. 14, 2018

(87) PCT Pub. No.: WO2017/045035
PCT Pub. Date: Mar. 23, 2017

(65) Prior Publication Data
US 2018/0263213 A1     Sep. 20, 2018

(30) Foreign Application Priority Data

Sep. 17, 2015  (AU) ................ 2015903798
Oct. 7, 2015   (AU) ................ 2015904087

(51) Int. Cl.
*A01K 13/00*   (2006.01)
*A61D 7/00*    (2006.01)
*E06B 7/32*    (2006.01)
*F16B 11/00*   (2006.01)

(52) U.S. Cl.
CPC .......... *A01K 13/003* (2013.01); *A61D 7/00* (2013.01); *E06B 7/32* (2013.01); *F16B 11/006* (2013.01)

(58) Field of Classification Search
CPC .......................... A01K 13/003; A01K 13/004

USPC .................................. 119/660–664
See application file for complete search history.

(56) References Cited

U.S. PATENT DOCUMENTS

| | | | | |
|---|---|---|---|---|
| 1,240,277 A | * | 9/1917 | Williams | A01K 35/00 119/345 |
| 1,302,979 A | * | 5/1919 | Schipper | A01K 39/012 119/52.1 |
| 1,731,181 A | * | 10/1929 | Shimp | A01K 13/004 119/658 |

(Continued)

OTHER PUBLICATIONS

International Search Report & Written Opinion dated Dec. 7, 2016 from PCT Application No. PCT/AU2016/050871.

*Primary Examiner* — Magdalena Topolski
*Assistant Examiner* — Morgan T Barlow
(74) *Attorney, Agent, or Firm* — Innovation Capital Law Group, LLP; Vic Lin

(57) ABSTRACT

A chemical applicator for a pet door includes a substantially wedge shaped body defining a chemical reservoir therebetween. The wedge shaped body presents a ramped transition between the surface of the pet door above the chemical applicator and the front of the chemical applicator being devoid of substantial sharp edges of protrusions that may otherwise strike the pet or snag a collar of the pet as the pet brushes past the applicator. The front of the applicator includes a slit having a planar wick therethrough and therealong, the wick extending through the slit so as to define an interior portion for being soaked by a liquid chemical within the reservoir and an exterior chemical application portion. In use, as the pet brushes past the pet door and the chemical application portion rubs across the hide of the pet, applying the liquid chemical thereon.

10 Claims, 16 Drawing Sheets

(56) References Cited

U.S. PATENT DOCUMENTS

| | | | | |
|---|---|---|---|---|
| 2,331,842 A | | 10/1943 | Moran | |
| 2,814,273 A | * | 11/1957 | Dickens, Sr. | A01K 13/003 119/662 |
| 3,071,111 A | * | 1/1963 | Hamilton | A01K 13/003 119/656 |
| 3,076,436 A | * | 2/1963 | Newsome | A01K 13/003 119/660 |
| 3,137,274 A | * | 6/1964 | Palmer | A01K 5/0114 119/657 |
| 3,167,055 A | * | 1/1965 | McLaughlin | A01K 13/003 119/656 |
| 3,175,537 A | * | 3/1965 | Paul | A01K 13/004 119/656 |
| 3,295,502 A | * | 1/1967 | Muhe | A01K 13/003 119/658 |
| 3,364,900 A | * | 1/1968 | Knapp | A01K 13/003 119/661 |
| 3,538,891 A | * | 11/1970 | Williams | A01K 13/004 119/658 |
| 3,902,461 A | * | 9/1975 | Cortner, Jr. | A01K 13/003 119/661 |
| 4,079,700 A | * | 3/1978 | Eshnaur | A01K 13/003 119/678 |
| 4,543,913 A | * | 10/1985 | Wilkeson | A01K 13/003 119/603 |
| 5,027,747 A | | 7/1991 | Talley | |
| 5,393,537 A | * | 2/1995 | Rawlins | A01K 85/01 426/1 |
| 5,447,122 A | * | 9/1995 | Cortner, Jr. | A01K 13/003 119/672 |
| 5,456,212 A | * | 10/1995 | Gross | A01K 13/003 119/658 |
| 5,458,088 A | * | 10/1995 | Owens | A01K 1/035 119/622 |
| 5,666,906 A | * | 9/1997 | Moore | A01K 13/003 119/672 |
| 5,785,004 A | | 7/1998 | Hobbs | |
| D407,500 S | * | 3/1999 | Gribble | A01K 13/003 D25/48.3 |
| 6,793,429 B2 | | 9/2004 | Arrison | |
| 6,811,057 B2 | * | 11/2004 | Duquet | B65D 75/38 222/105 |
| 8,176,652 B2 | * | 5/2012 | Donahue | A22B 5/0082 34/399 |
| 8,833,308 B1 | | 9/2014 | Patterson | |
| 2006/0070583 A1 | * | 4/2006 | Cortner, Jr. | A01K 13/003 119/662 |
| 2008/0047500 A1 | | 2/2008 | Conway | |
| 2009/0031965 A1 | * | 2/2009 | Campbell | A01K 13/003 119/652 |
| 2009/0145370 A1 | * | 6/2009 | Sullivan | A01K 13/004 119/707 |
| 2011/0232579 A1 | * | 9/2011 | Clayson | A01K 13/002 119/622 |

\* cited by examiner

CHEMICAL APPLICATOR FOR A PET DOOR

FIELD OF THE INVENTION

The present invention relates to a chemical applicator and in particular, but not necessarily entirely, to a chemical applicator configured for adhesion to a pet door so as to apply chemicals to pets passing therethrough.

BACKGROUND

US 2008/0047500 A1 (D1) discloses a pesticide applicator for use on a pet door featuring an affixing means operationally configured to secure the pesticide applicator to a pet door, an applicator surface disposed on the pesticide applicator, where the applicator surface is configured to receive and dispense pesticides on a pet passing through or near said pet door.

Specifically, FIG. 1 shows is a perspective drawing of the pet door incorporating the removable pesticide applicator of D1. Furthermore, FIG. 2 shows a perspective drawing of the applicator of D1 wherein a pesticide applicator is fixed to the front, rear, or both of a pet door. It further, FIG. 3 shows a perspective view of the applicator of FIG. 1 showing the underside and adhesive means for affixing said polygonal applicator to a pet door.

Now, D1 comprises several disadvantages or limitations.

Specifically, from the embodiment shown at least in FIG. 1 and FIG. 3 wherein the applicator of D1 engages the lower edge of the pet door flap, D1 is not suitable for pet doors having non-straight edges.

Furthermore, these embodiments of D1 may interfere with the closing of the door especially for pet doors having a very narrow gap between the door and the jamb.

Furthermore, for the bottom and shown in FIG. 1, water may gather within the upwardly open U-shaped applicator, thereby either degrading the chemical or causing the chemical to seep onto the floor. Furthermore, chemical may accumulate within the U-shaped applicator which may then spill on the back of the pet when the pet door is deflected. Furthermore, such accumulated liquid may corrode the door.

As can be seen, such a U-shaped configuration as a substantially shown in FIG. 1 extends to both sides of the door including the exterior of the door which may be exposed to rain and the like causing the U-shaped configuration to accumulate water.

Furthermore, such a U-shaped configuration is a substantially shown in FIG. 1 be installed incorrectly too far towards one edge or move laterally so as to hinder the proper operation of the door. Furthermore, any accumulated rainwater may weaken the glue causing the applicator of D1 to become dislocated or to move laterally or downwardly thereby interfering with the operation of the door.

Furthermore, embodiments of D1 present sharp edges, protrusions and the like which may hit or strike the pet, causing harm or pain, such as when strike in the nose of the pet or alternatively snagging the pet collar or the like.

Furthermore, the is difficult to ascertain the chemical levels from the embodiments provided by D1.

Furthermore, for the embodiments provided by D1, it is difficult to apply different types of chemicals such as where, for example, the user would want to apply flea and tick chemicals simultaneously.

U.S. Pat. No. 8,833,308 B1 (D2) discloses a pet door fluid/powder applicator device disposed upon the bottom of the flap of a typical pet door. The pet door fluid/powder applicator device includes at least one roller volubly disposed on an underside of a chamber. At least one interior cavity is disposed within the chamber. The cavity is configured to store fluid/powder in contact with a first portion of the roller. The fluid/powder is applied to the hide of an animal as the animal is caused to contact and rotate the at least one roller of the rollers.

Specifically, FIG. 3 shows an embodiment of D2 comprising the chamber 20 being generally cylindrical and including a first side 42 and a second side 44. A plurality of rollers 30A is disposed serried along a first row 46 and a second row 48, said first row 46 disposed along the first side 42 of the chamber 20 and the second row 48 disposed along the second side 44 of the chamber 20 whereby the first row 46 and the second row 48 contact the hide of an animal when said animal uses the pet door 22 entering from a respective first direction and a respective second direction.

In an embodiment illustrated in FIG. 4, D2 discloses chamber 20 which has a cross-section comprising a sector and the at least one roller 30A, 30B, 30C comprises two cylindrical rollers 30C disposed at the extremes of the arc 50 of said sector along the underside 24 of the chamber 20. A vertical partition 52 separates each of a first interior cavity 28A and a second interior cavity 28B wherein separate fluid/powders are containable, as desired. Each of the two cylindrical rollers 30C is volubly engaged by an animal entering through the pet door in either direction respectively, and fluid/powder 32 housed within the interior cavity 28 is thusly likewise applied to the hide of the animal as it passes through the pet door.

In an embodiment illustrated in FIG. 5, D2 discloses at least one roller 30A, 30B, 30C comprises a cylindrical roller 30B rotatably disposed on the underside 24 of the chamber 20. The chamber 20 is considered to be generally hemi-cylindrical, with a flattened underside 24 (see FIG. 7). The roller 30B is volubly engaged when an animal uses the pet door 22 and fluid/powder 32 within the chamber 20 is dispensed to the hide of said animal.

Now, D2 similarly comprises several disadvantages or limitations.

Firstly, as can be appreciated, the embodiments of D2 are integrally built within the pet door and, therefore, D2 is not suited for retrofit to existing pet doors. Specifically, as can be seen from FIG. 4, the reservoirs of D2 are fastened to the lower edge of the door so as to swing beneath it. The embodiment shown in FIG. 5 shows a similar configuration.

As such, so as to implement the embodiments of figure D2, the user would be required to install a pet door having the applicator of D2 inbuilt which may include removing an existing pet door where one exists.

Furthermore, the embodiments of figure D2 are ill suited for applying different types of chemicals such as the above mentioned tick and flea chemicals which may be required to be applied simultaneously.

Furthermore, the embodiments of figure D2 similarly comprises sharp edges, protrusions and the like which catch the pet or the pet collar creating discomfort or pain for the pet, snagging of the pet collar and the like.

Furthermore, the apparatus of D2 is quite heavy thereby increasing the inertia of the pet door. As such, a dog running swiftly through a pet door comprising the apparatus of figure D2 would experience quite some resistance when striking the pet door.

Furthermore, the rollers of D2 or exposed on the exterior side of the pet door, therefore being prone to environmental dust, rain, contaminations and the like. Furthermore, such debris may cause the rollers to become stuck.

Furthermore, the rollers of D2 present a sticky surface to which debris become stuck, such as dog hair and the like causing the rollers to choke, become stuck and stop rotating.

Furthermore, the rollers of D2 comprise moving parts which in themselves are prone to failure.

Furthermore, swift motion of the pet door such as potentially from a whiplash effect as shown in FIG. 3 may cause the liquid chemical to be forced past the rollers.

SUMMARY OF THE DISCLOSURE

According to one aspect, there is provided a powdered chemical applicator for a pet door, the applicator comprising: a substantially wedge shaped body having a planar front and rear, sides therebetween and a planar base and wherein the sides are substantially triangular such that the planar front and rear converge at a top edge and are spaced apart at a lower opposite end thereof by the planar base so as to define a powdered chemical reservoir therebetween and wherein: the applicator is to be adhered to the pet door orientated with the top edge at the top thereof such that the applicator presents a ramped transition between the surface of the pet door above the chemical applicator and the front of the chemical applicator being devoid of substantial sharp edges of protrusions that may otherwise strike the pet or snag a collar of the pet as the pet brushes past the applicator from the top to the bottom of the applicator in use; and the front comprises at least one vent such that, in use, as pet door is deflected by a pet, the powdered chemical is jostled within the powdered chemical reservoir such that at least a some thereof becomes airborne such and at least some of the airborne powdered chemical is ejected through the at least one vent onto the pet.

The at least one vent may be located towards the top edge such that, in use, the at least one vent may be located above the surface of the powdered chemical when the powdered chemical may be settled within the chemical reservoir.

The at least one vent may comprise a plurality of vents in a row substantially in line with the top edge.

The body may be able to assume a non-compressed configuration and a compressed configuration such that, in use, when force may be applied to the front as the pet comes into contact with the applicator, the body compresses so as to decrease the interior volume of the body so as to force the powdered chemical through the at least one vent.

When transitioning from the non-compressed configuration to the compressed configuration, the front may move towards the rear so as to decrease the interior volume of the body.

The body may be configured to rest in the non-compressed configuration.

The body bends at the top edge as the front moves towards the rear.

In the resting non-compressed configuration, the powdered chemical may settle within the interior volume of the body beneath the at least one vent and wherein, when the pet strikes the applicator in use, the settled powdered chemical may be jostled such that at least some of the powdered chemical becomes airborne where after the body may be compressed when the front moves towards the rear so as to reduce the interior volume of the body such that the airborne powdered chemical may be forced through the at least one vent.

The base and the sides may be deformable so as to allow the front to move with respect to the rear.

The base and the sides may be concertinaed.

The base may comprise concertina lines running in parallel along the length of the base.

The sides may comprise concertina lines converging at the top edge.

The chemical applicator may further comprise a sealable refill aperture through the body.

The refill aperture may be located through the front.

The chemical applicator may further comprise a hinged planar lid for sealing the refill aperture.

The body may be substantially see-through for ascertaining a level of the powdered chemical.

In accordance with a further aspect, there is provided a liquid chemical applicator for a pet door, the applicator comprising: a substantially wedge shaped body having a planar front and rear, sides therebetween and a planar base and wherein the sides are substantially triangular such that the planar front and rear converge at a top edge and are spaced apart at a lower opposite end thereof by the planar base so as to define a liquid chemical reservoir therebetween and wherein: the applicator is to be adhered to the pet door orientated with the top edge at the top thereof such that the applicator presents a ramped transition between the surface of the pet door above the chemical applicator and the front of the chemical applicator being devoid of substantial sharp edges of protrusions that may otherwise strike the pet or snag a collar of the pet as the pet brushes past the applicator from the top to the bottom of the applicator in use; and the front comprises a slit having a planar wick therethrough and therealong, the extending through the slit so as to define an interior portion for being soaked by the liquid chemical within the reservoir and an exterior chemical application portion, wherein, in use, as the pet brushes past the pet door the chemical application portion rubs across the hide of the pet applying the liquid chemical thereon The slit may be located above a surface level of the liquid chemical.

The interior portion may be sufficiently lengthened to dip into the liquid chemical when the applicator may be in an upright orientation.

The interior portion lies above a surface of the liquid chemical and wherein the liquid chemical splashes across the interior portion when the pet door may be deflected.

The wick may have sufficient width to occupy the entire length of the slit.

The body may be substantially transparent for inspecting a surface level of the liquid chemical.

The chemical applicator may further comprise a refill aperture for refilling the liquid chemical reservoir.

The refill aperture may be located towards the top edge for being above a surface of the liquid chemical in use.

The chemical applicator may further comprise a screw cap for sealing the refill aperture.

The chemical liquid reservoir may comprise an internal partition to segment the reservoir into two separate segments and wherein the two separate segments comprise differing chemical types and an associated respective separate wick.

The internal partition conforms in shape to the sides of the body and may be located midway across the applicator when viewed from the front of the applicator and wherein the separate wicks comprise collocated exterior chemical application portions The internal partition conforms in shape to the front or rear of the body and divides the applicator into front and rear sections when viewed from the front of the applicator and wherein the separate wicks may comprise a rear wick extending through an upper slit and a forward wick extending through a lower slit.

According to another aspect, there is provided A chemical applicator strip comprising: a rear adhesion means configured for adhering the chemical applicator to a pet door; and a front chemical containing and applicator means such that in use, as pet door is deflected by a pet, the chemical containing and applicator means applies a chemical onto the hide of the pet wherein, when the applicator is adhered to the pet door, strip comprises a low profile transition between the surface of the pet door above the strip and the strip being devoid of substantial sharp edges of protrusions that may otherwise strike the pet or snag a collar of the pet as the pet brushes past the strip from the top to the bottom of the applicator in use.

The adhesion means may comprise an adhesive so as to allow the adhesion means to stick to the pet door.

The chemical applicator may further comprise a rearward removable strip for covering the rear adhesion means and for removal prior to use so as to expose the adhesion means.

The chemical containing and applicator means may be impregnated with the chemical.

The chemical containing and applicator means may comprise a porous material.

The porous material may comprise at least one of sponge, foam and rubber.

The chemical applicator may further comprise a front removable strip for covering the front chemical containing and applicator means removable in use so as to expose the chemical containing and applicator means.

The chemical applicator may further comprise a foam substrate being bounded rearwardly by the adhesion means and frontwardly by the front chemical containing and applicator means.

The width of the strip may be the same or less than the width of the pet door.

The strip may comprise widthwise preparations for tearing off portions of the strip to suitably lengthen the strip.

The chemical containing and applicator means may be erodible configured to erode upon contact with the pet so as to the wear away and leave a residue on the pet.

The chemical containing and applicator means may comprise a chemically impregnated erodible material.

The erodible material may comprise chalk.

The chemical applicator may further comprise a visually distinctive backing behind the erodible material such that the extent of erosion of the erodible material may be visually apparent.

The visually distinct backing may comprise differing colouring to that of the erodible material.

The visually distinct backing may comprise printed replacement instructions.

The chemical applicator may further comprise a further intermediate visually indicative erodible layer between the backing and the erodible material.

Other aspects of the invention may be also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
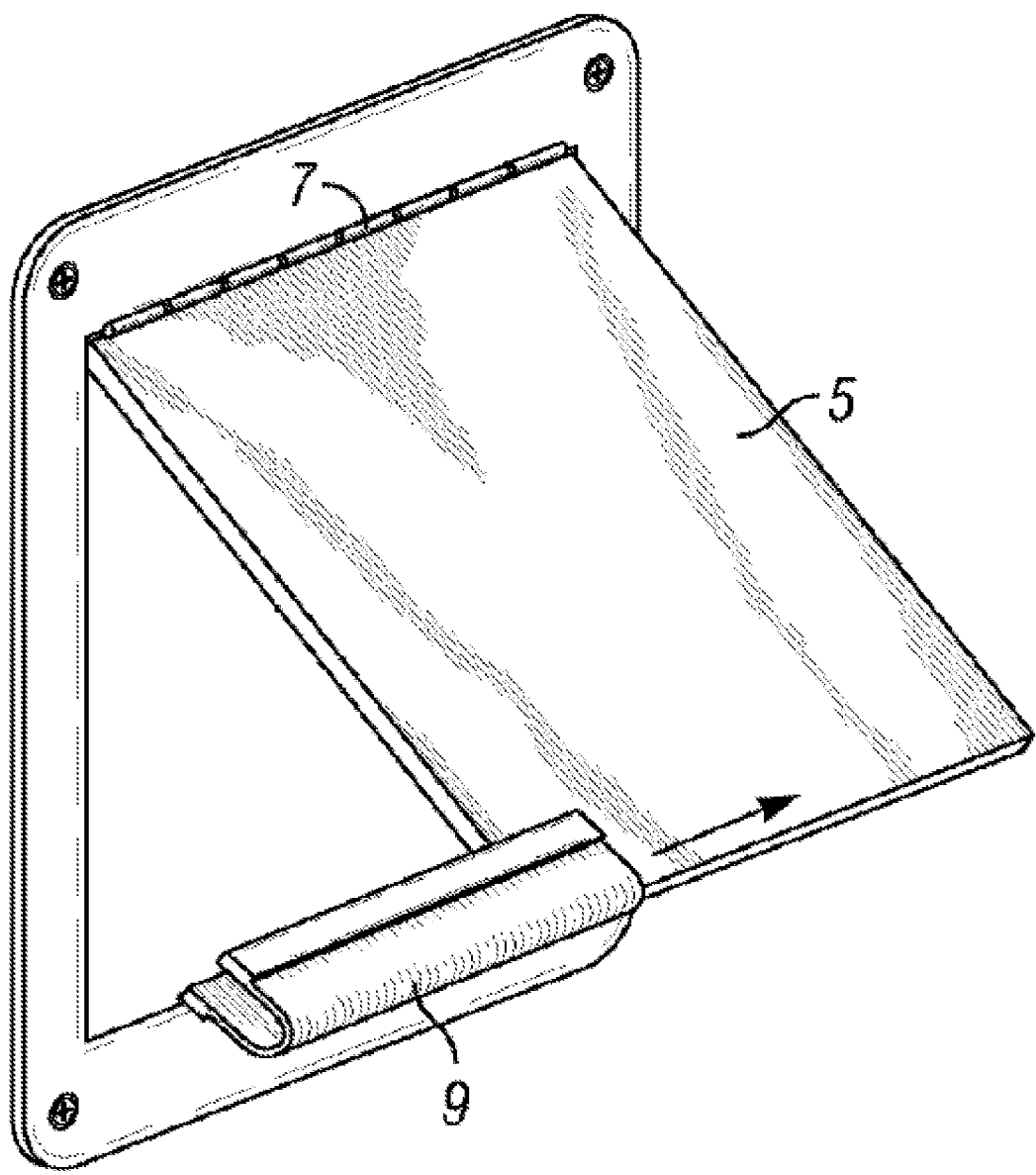
FIGS. 1-2 show a chemical applicator in accordance with a first prior art embodiment.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure.

Before the structures, systems and associated methods relating to the chemical applicator are disclosed and described, it is to be understood that this disclosure is not limited to the particular configurations, process steps, and materials disclosed herein as such may vary somewhat. It is also to be understood that the terminology employed herein is used for the purpose of describing particular embodiments only and is not intended to be limiting since the scope of the disclosure will be limited only by the claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterised by," and grammatical equivalents thereof are inclusive or open-ended terms that do not exclude additional, unrecited elements or method steps.

It should be noted in the following description that like or the same reference numerals in different embodiments denote the same or similar features.

Chemical Applicators

In the embodiments that follow, there will be described chemical applicators for the automated application of chemicals to pets. In embodiments, the chemical applicators may be used for other animals such as farms animals, wildlife and the like.

As will be appreciated from the ensuing description, the chemical applicators may apply different types of chemicals, including chemicals in solid form (such as by way of an erodible chemically impregnated chalk like substance), liquid form and powdered form.

These chemicals include chemicals such as pesticides, such as for those treating ticks, fleas, worms and the like, deodorisers, markers and the like. For example, the chemical can be a medication, vaccine, pesticide, deodoriser, scent markers, hormone, dyes or any organic or inorganic chemicals or a combination of these. For example the chemical may comprise a flea and tick remedy.

Chemicals may include natural Pyrethrins, or synthetic Pyrethroids (Permethrin, Phenothrin, Etofenprox), Imidacloprid, or Arylheterocycles combined with Insect growth regulators (ICRs) and insect development inhibitors (IDIs) like methoprene (Precor), fenoxycarb, and pyriproxyfen (Nylar) (insect growth inhibitors include lufenuron and diflubenzuron).

As will become apparent from the description below, the chemical applicators are configured for applying chemicals in a substantially automated manner and may negate the need for human handling of the animal when applying the chemical.

In a preferred embodiment, the chemical applicator is configured for adherence to a convention pet door. Such pet doors are commonplace within households and comprise an aperture closed off by a deflectable flap for allowing pets to enter and exit a household.

Specifically, as will be described in further detail below, the chemical applicator may be configured to adhere to the deflectable flap of the pet door such that, in use, as the pet enters and/or exits the pet door and deflects the deflectable flap, the chemical applicator makes contact with the pet so as to apply the chemical in an automated manner.

For the embodiments where the chemical applicator is configured to work in conjunction with a pet door, there will be described in further detail below three embodiments comprising a first embodiment comprising the chemical applicator taking the form of a low-cost rectangular strip or other shape of device configured to adhere to the deflectable flap in a discreet manner, a second embodiment comprising the chemical applicator configured to dispense powdered chemicals and a third embodiment comprising the chemical applicator configured to dispense liquid chemicals from a liquid chemical reservoir.

First Embodiment—Strip Applicator

Figure 6:
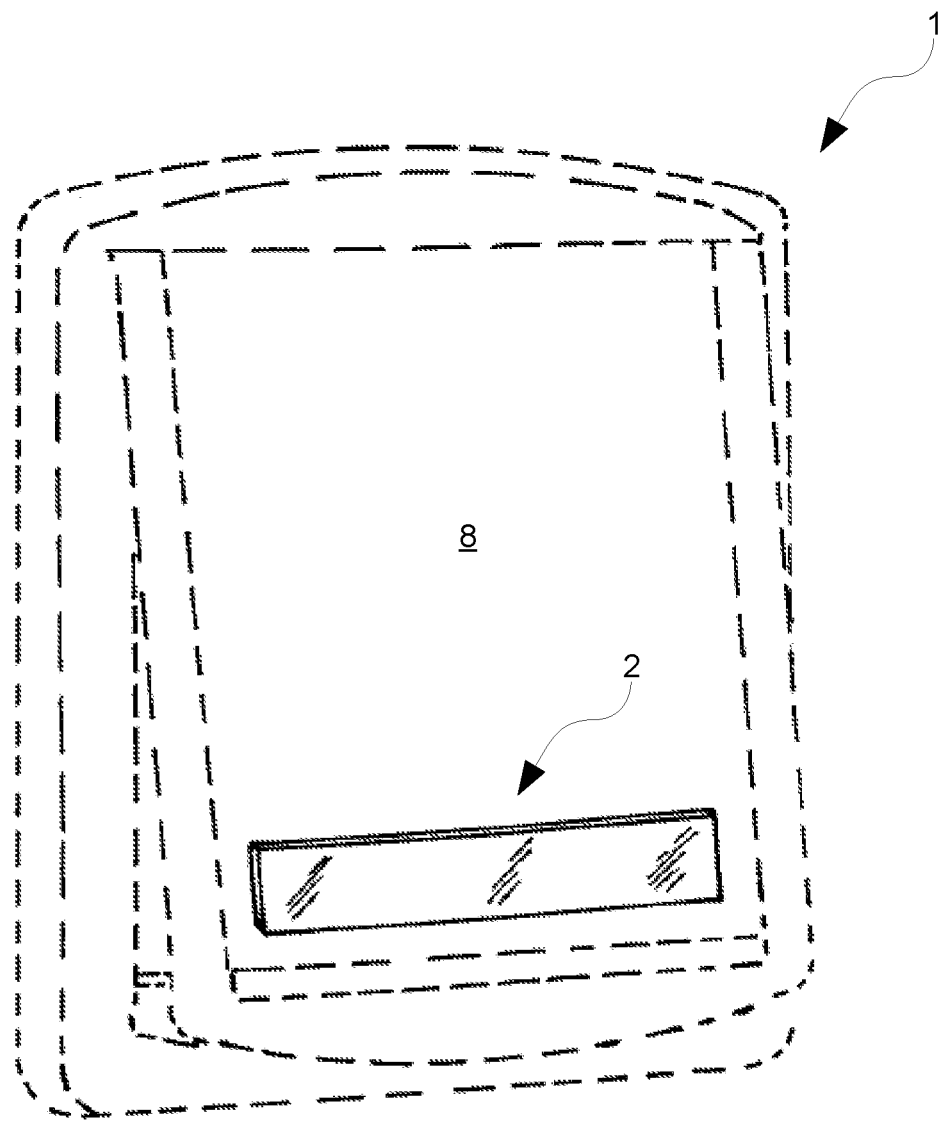
FIGS. 6-9 show a chemical applicator strip in accordance with a first embodiment.

Turning now to FIG. 6, there is shown the chemical applicator 2 taking the form of the first embodiment alluded to above. Specifically, as can be seen, the chemical applicator 2 is configured to work in conjunction with a pet door 1 and specifically, to adhere to the deflectable flap 8 of the pet door 1.

Figure 9:
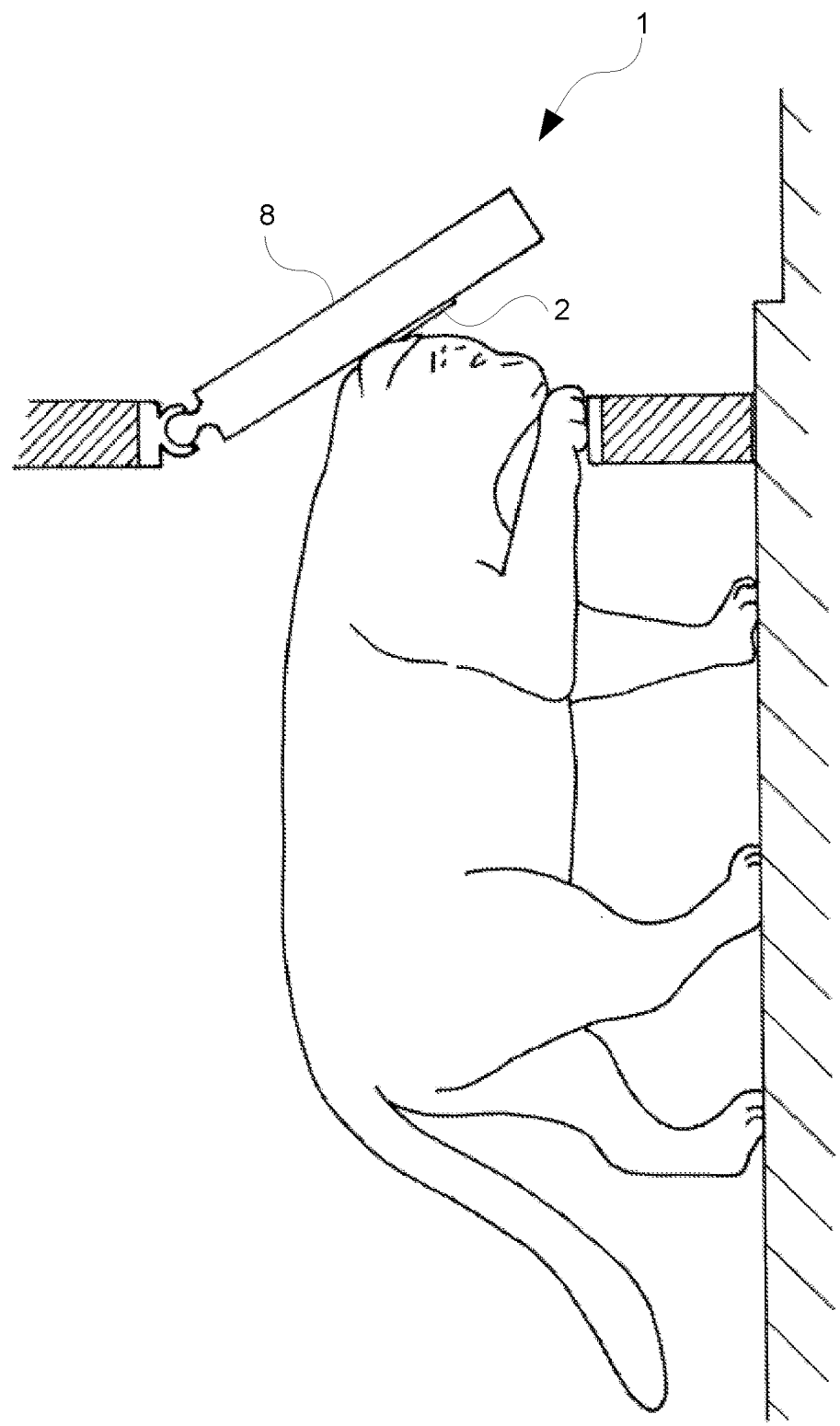

FIG. 9 shows the chemical applicator 2 in use wherein, as can be seen, as the pet cat exits the pet door 1 and deflects the deflectable flap 8, the chemical applicator 2 makes contact with the cat so as to apply the chemical contained within the chemical applicator 2 to the hide of the cat. As can be seen, when the applicator 2 is adhered to the pet door, strip 2 comprises a low profile transition between the surface of the pet door above the strip 2 and the strip being devoid of substantial sharp edges of protrusions that may otherwise strike the pet or snag a collar of the pet as the pet brushes past the strip from the top to the bottom of the applicator in use.

As can be appreciated, and as alluded to above, the cat therefore may not require conventional collar-type chemical applicators. Furthermore, the chemical is not required to be applied to the cat manually. Furthermore, as can be seen, the chemical applicator 2 advantageously applies the chemical to usually hard to reach places of the cat such as the forehead, neck and spine or the cat, a common refuge for parasites.

In this manner, the chemical applicator 2 advantageously provides a low-cost and discrete chemical applicator 2 configured to work in conjunction with commonplace pet doors 1 for the purposes of discreetly applying chemicals to household pets.

Figure 7A:
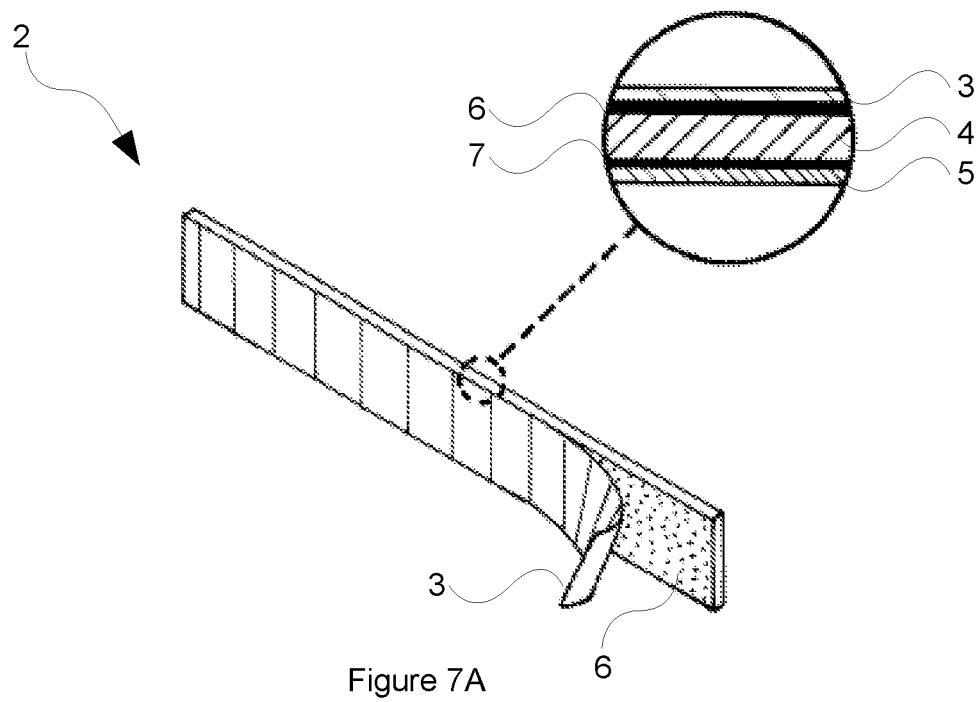
Figure 7B:
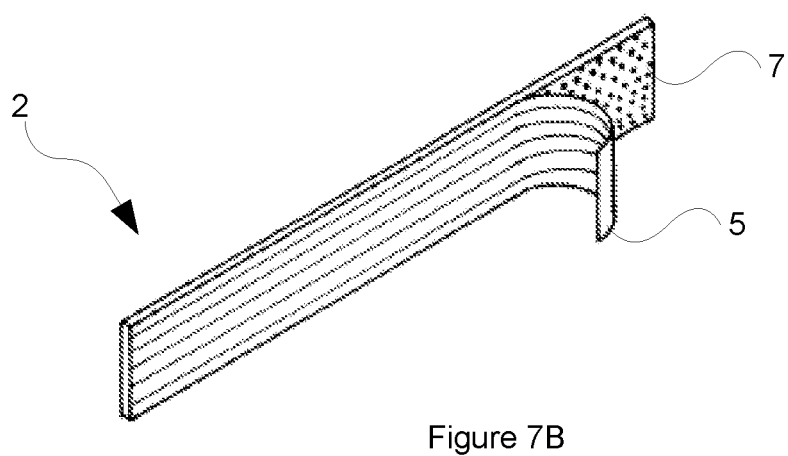

Turning now to FIG. 7, there is shown the chemical applicator 2 in accordance with the first embodiment in further detail. In the embodiment shown in FIG. 2, the chemical applicator 2 comprises adhesion means 6 configured for adhering the chemical applicator 2 to the deflectable flap 8 of the pet door 1.

In the embodiment shown, the adhesion means 6 comprises an adhesive so as to allow the adhesion means 6 to stick to the pet door.

In a preferred embodiment, the adhesion means 6 comprises a removable adhesive having sufficient strength to retain the chemical applicator 2 on the deflectable flap 8 in use while allowing for the subsequent removal once the chemical applicator 2 has become depleted without leaving unnecessary residue on the surface of the deflectable flap 8.

In the embodiment where the adhesion means 6 comprises an adhesive, the chemical applicator 2 may comprise a removable strip 3 configured for removal prior to use so as to expose the adhesion means 6.

In alternative embodiments, the adhesion means 6 may comprise a magnet so as to allow the adhesion means 6 to be fastened to metallic deflectable flaps.

In embodiments, the adhesion means 6 may comprise a combination of magnet and adhesive wherein, for the deflectable flaps 8 being metallic, the adhesion means 6 may simply be stuck to the deflectable flap 8 with the removable strip 3 in place whereas for nonmetallic deflectable flaps 8, the user may remove the removable strip 3 to expose the adhesive.

In other embodiments, the adhesion means 6 may comprise other adhesive mechanisms such as hook and loop fastener or other fastener type falling within the purposive scope of the embodiments described herein.

Furthermore, the chemical applicator 2 comprises a chemical containing and applicator means 7 held in place and supported by the adhesion means 6.

The chemical containing and applicator means 7 is configured for containing a chemical (such as the above described insecticide, deodoriser, marker etc) and applying the chemical to the pet in use. Specifically, in use, as the pet passes through the pet door 1 and deflects the deflectable flap 8, the chemical containing and applicator means 7 makes contact with the pet so as to apply the chemical to the pet.

In embodiments, the chemical applicator 2 may further comprise a front removable strip 5 removable in use so as to expose the chemical containing and applicator means 7.

Figure 8A:
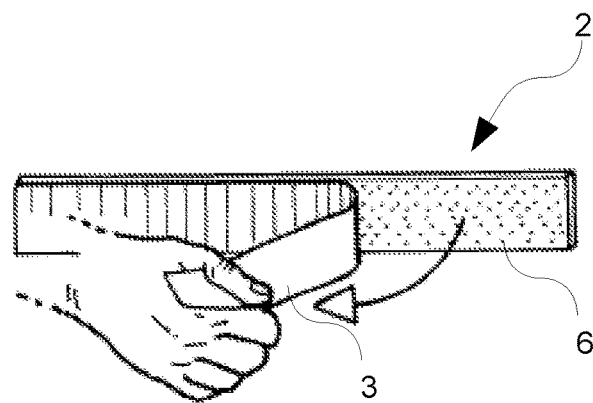

Specifically, in one embodiment, the chemical applicator 2 may be utilised in the manner shown in FIG. 8. Specifically, FIG. 8A shows the removable strip 3 being peeled from the chemical applicator 2 so as to expose the adhesion means 6.

Figure 8B:
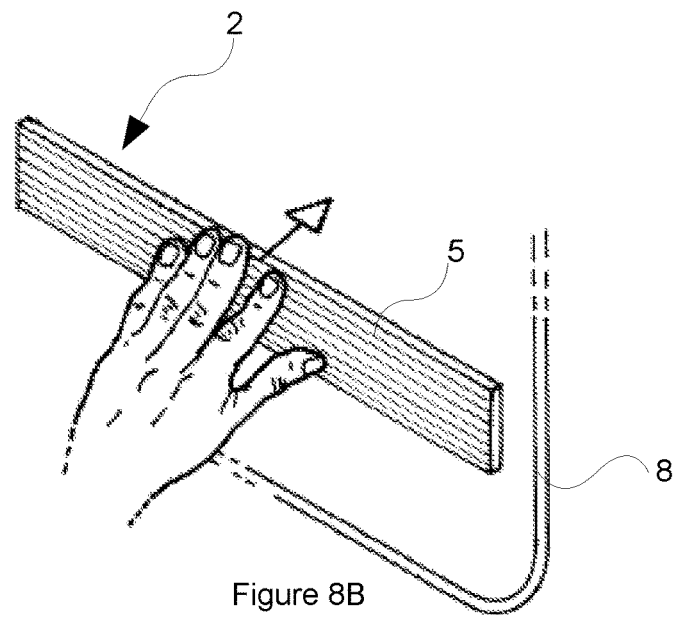

FIG. 8B shows the chemical applicator 2 thereafter being stuck to the lower edge of the deflectable flap 8.

Figure 8C:
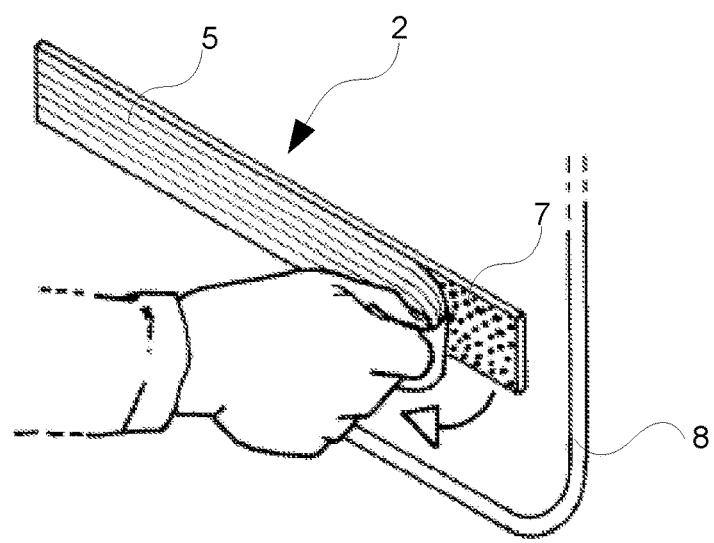

Finally, FIG. 8C shows the covering removable strip 5 being peeled from the adhered chemical applicator 2 so as to expose the chemical containing and applicator means 7.

It should be appreciated that, in embodiments, the chemical applicator 2 need not necessarily comprise either or both of the removable strips 3, 5. For example, the chemical applicator 2 may be provided in packaging which exposes either the adhesion means 6 or the chemical containing and applicator means 7 when the chemical applicator 2 is removed from the packaging.

Furthermore, the removable strip 5 may be required where the chemical containing and applicator means 7 is impregnated with a liquid chemical so as to prevent the evaporation of the liquid chemical prior to use. However, in other embodiments, such as where the chemical is provided in another form, such as a gel, chalk like substance (as described in further detail below), powdered form or the like, removable strips need not necessarily be required.

In one embodiment, the chemical applicator 2 may comprise a cross-section as is substantially shown in FIG. 7A.

Specifically, the chemical applicator 2 may comprise a foam substrate 4 so as to give the chemical applicator 2 body, the foam substrate 4 being bounded at the rearward edge by the adhesion means 6 and the rearward removable strip 6. The forward edge may be bounded by the chemical containing and applicator means 7 and the forward removable strip 5.

However, in embodiments, the substrate 4, being foam, sponge or other porous material may be impregnated with the chemical for subsequent application such that the substrate 4 is the chemical containing and applicator means 7.

In embodiments, once the chemical applicator 2 has become depleted, the chemical applicator 2 may be removed from the deflectable flap 8 and replaced. However, in other embodiments, the chemical containing and applicator means may be replenished, such as by way of a chemical dropper for the like.

In the embodiment shown in FIG. 1, the chemical applicator 2 is placed at the lower edge of the deflectable flap 8. In this manner, the chemical applicator 2 advantageously makes most contact with the pet as the pet passes through the door 1. In this regard, the chemical applicator 2 may be sized in accordance with the dimensions of the deflectable flap 8. Specifically, as can be seen, the width of the chemical applicator 2 is the same or less than the width of the deflectable flap 8.

In this manner, the chemical applicator 2 may be sold having a width suited for common deflectable flap 8 dimensions. However, in other embodiments, chemical applicators 2 comprising differing widths may be sold for deflectable flaps 8 having differing widths.

In embodiments, the chemical applicator 2 may comprise widthwise lines of weakness so as to allow the tearing off of sections of the chemical applicator 2 so as to be correctly sized for a particular pet door 1.

In the embodiment shown in FIG. 1, the chemical applicator 2 is substantially rectangular shape so as to be suited for location towards a lower edge of the deflectable flap 8. As alluded to above, the location towards the lower end of the deflectable flap 8 advantageously allows the chemical applicator 2 to make most contact with the pet as the pet passes through the door 1.

Furthermore, the shape of the chemical applicator 2 allows the chemical applicator to span substantially the entire width of the deflectable flap 8 advantageously allowing for the application of the chemical irrespective of the lateral position of the pet.

Furthermore, as can be appreciated from the applicator 2 in accordance with this first embodiment, the applicator 2 comprises a low profile when adhered to the flap 8, avoiding sharp edges or protrusions which may hit or hurt the pet (such as the nose of the pet), catch on collars and the like.

In embodiments, a plurality of applicators 2 may be applied to the deflectable flap 8. For example, a user may wish to deworm and deodorise their pet dog. In this manner, the user may apply the pesticide containing applicator 2 vertically adjacent a deodoriser applicator 2 so as to apply the two types of chemical substantially simultaneously to the dog.

In other embodiments, the chemical applicator 2 may comprise a combination of chemicals such as the abovementioned combination of both a dewormer and deodoriser. In embodiments, these chemicals may be co-mingled when impregnating the chemical applicator 2 or may alternatively be separated by being applied to differing locations of the chemical applicator 2, the latter being a specially advantages where the chemicals must be kept separate.

In embodiments, portions of the cover strip 5 may be removed to expose only certain areas of the applicator 2 so as to, for example, control which chemical is applied if the applicator 2 comprises two or more collocated chemicals or alternatively to control the rate of release of the chemical.

Figure 2:
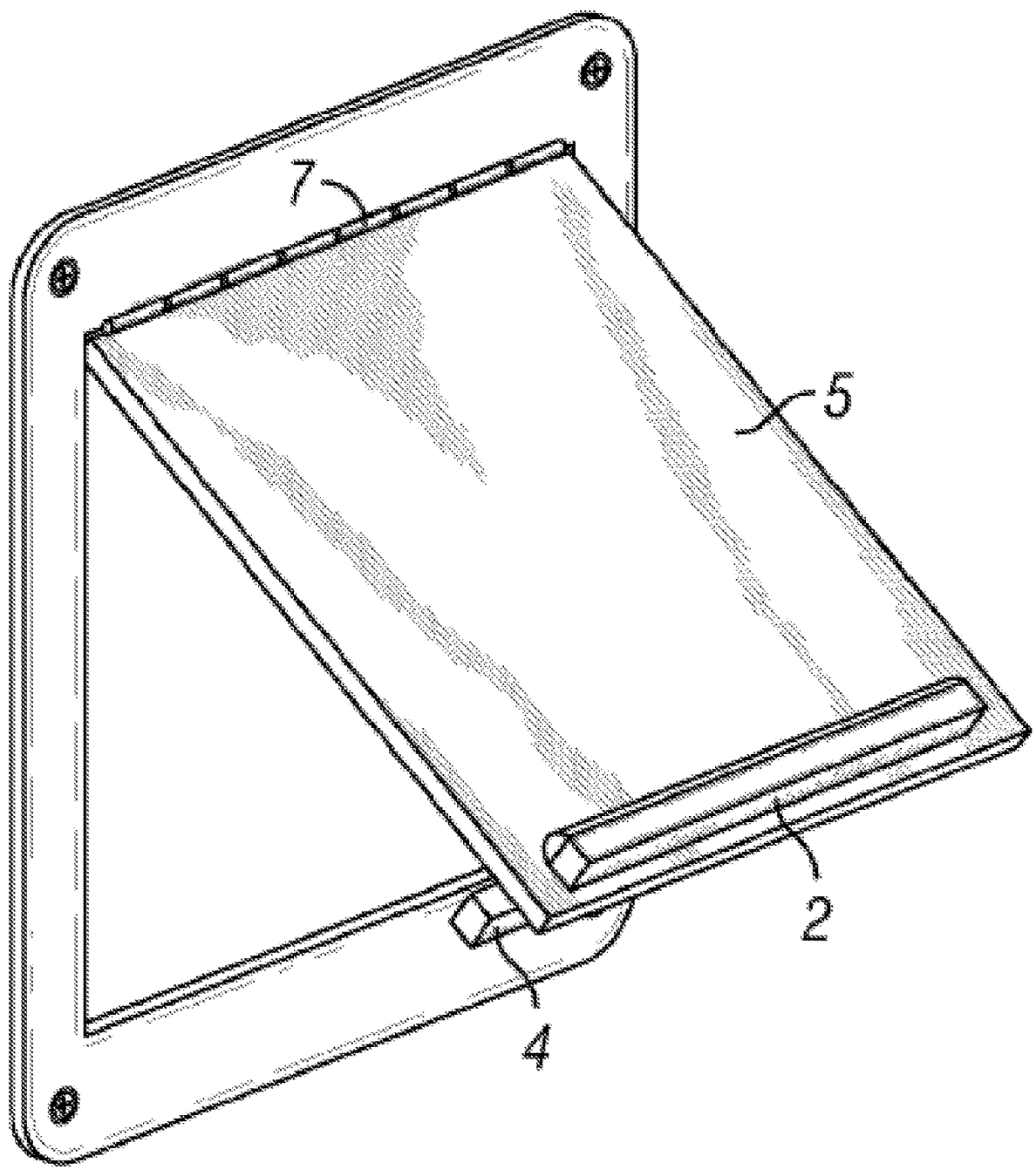
Figure 3:
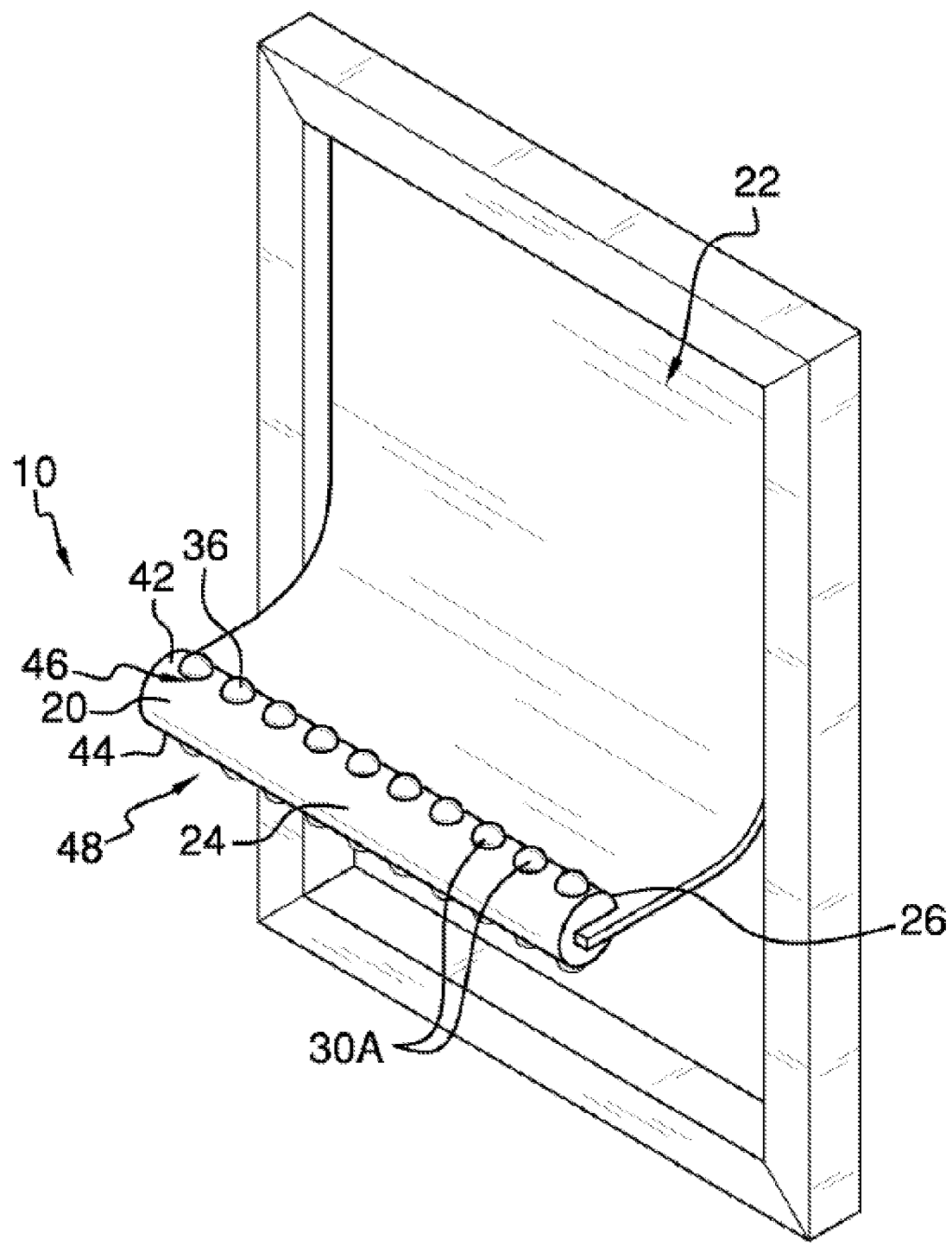
FIGS. 3-5 show a chemical applicator in accordance with a second prior art embodiment.
Figure 4:
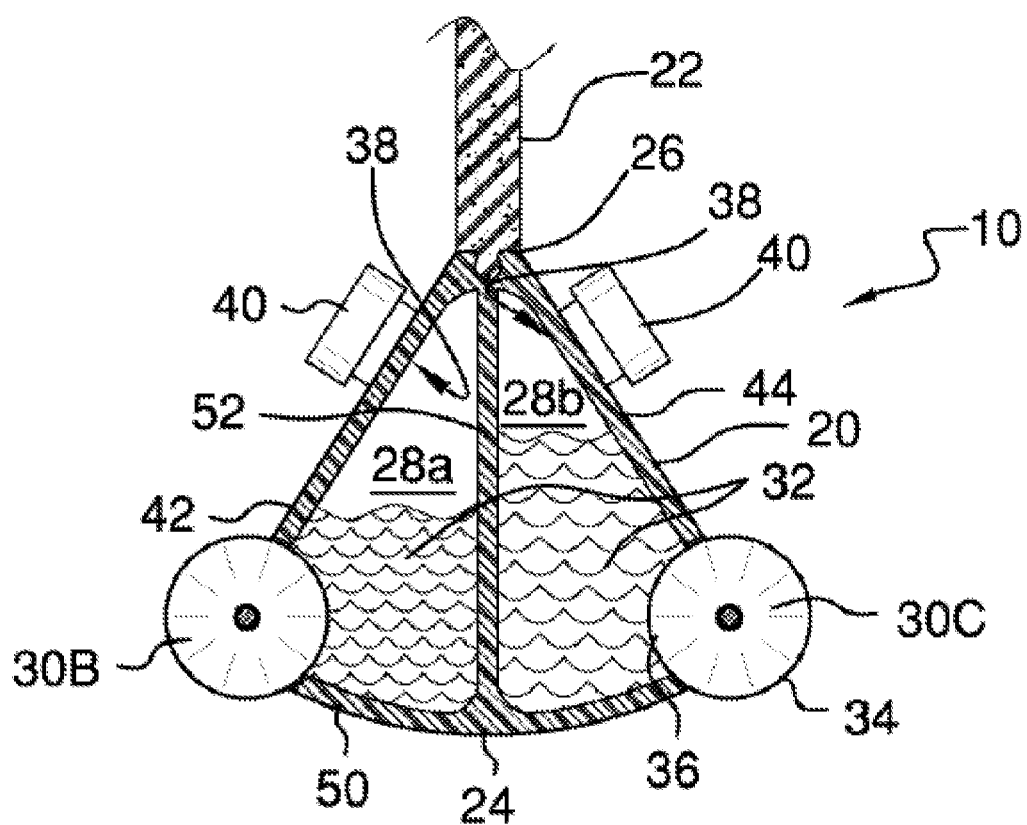
Figure 5:
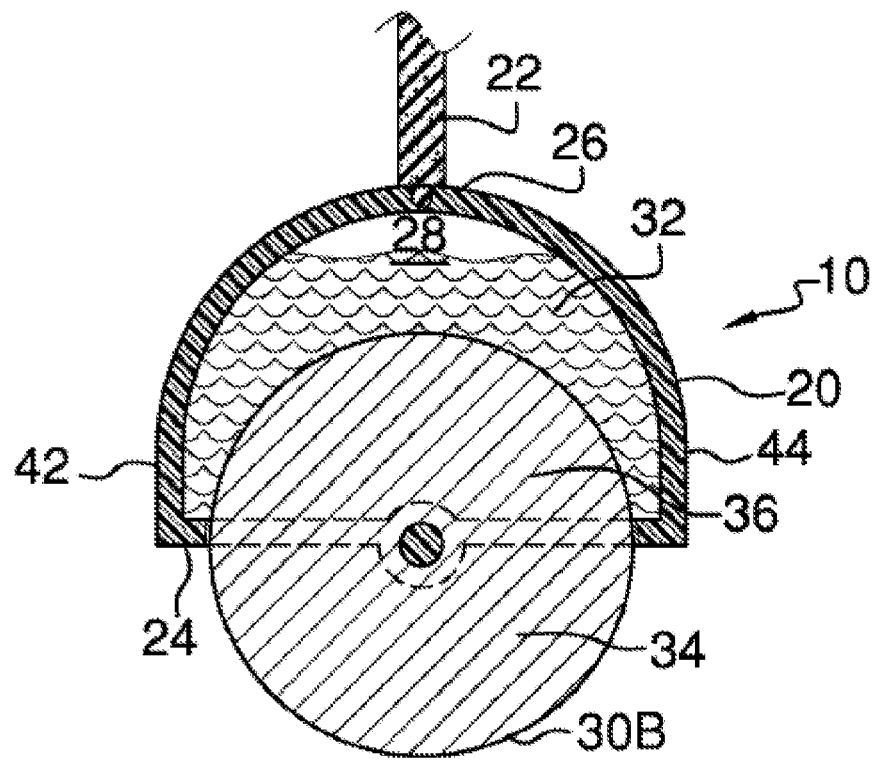

In the embodiment shown in FIG. 2, the chemical applicator 2 may be impregnated with the chemical. Specifically, the chemical containing and applicator means 7 may comprise a porous material, such as sponge, foam or the like configured to absorb the chemical for subsequent application.

As such, in use, the chemical is configured to seep from the impregnated chemical containing and applicator means 7 and smear the hide of the pet with the chemical as the pet passes through the door 1.

However, in other embodiments, the chemical may be applied in other manners, such as, where for example, the chemical containing and applicator means is configured to erode. For example, in one embodiment, the chemical containing and applicator means 2 may comprise a chalk-like substance configured to erode upon contact with the pet so as to the wear away and leave a powdery residue on the pet.

However, the chemical containing and applicator means 7 may comprise other erodible materials falling within the purposive scope of the embodiments described herein, including a solid, semi-solid, rubberlike, plastic, jelly-like substance including wax, fabric, foam, sponge, fibre rod, resin. resin modifiers, or other man made and artificial materials that erodes on contact with the pet.

In embodiments, the chalk like substance may be coloured such that the depletion of the substance may be visually apparent from a change in coloration of the chemical applicator 2. For example, the chalk like substance may be blue and backed by a red backing. As such, once the chalk like substance has been eroded away, the red backing is exposed so as to provide a visual indication to the pet owner that the applicator 2 requires replenishing or replacing.

In embodiments, the backing may comprise wording such as "Replace Strip" so as to provide instructions to the user.

In further embodiments, differing coloured layers may be utilised to indicate to the user the extent of depletion. For example, the applicator 2 may comprise a red backing comprising a yellow intermediate layer and a blue fronting. As such, as the blue layer is eroded, the yellow layer becomes exposed indicating to the user that the applicator 2 may require replenishment soon. Continued erosion will expose the red layer indicating to the user that the chemical is depleted.

In an embodiment, a plurality of strips 2 may be co-located on the pet door 8 so as to be able to simultaneously apply different chemicals. For example, a vet may recommend a plurality of chemicals to apply to users which chemicals may be applied in accordance with differing regions. For example, certain regions may have a particular prevalence of ticks where others do not. As such, for a particular location, a vet may recommend the appropriate strips 2 to be applied to the pet door 8 to be suited for that particular region. In further embodiments, they plurality of strips 2 may be packaged for particular regions wherein the plurality of strips 2 comprise the appropriate chemicals for that region.

Second Embodiment—Powdered Chemical Applicator

Figure 10:
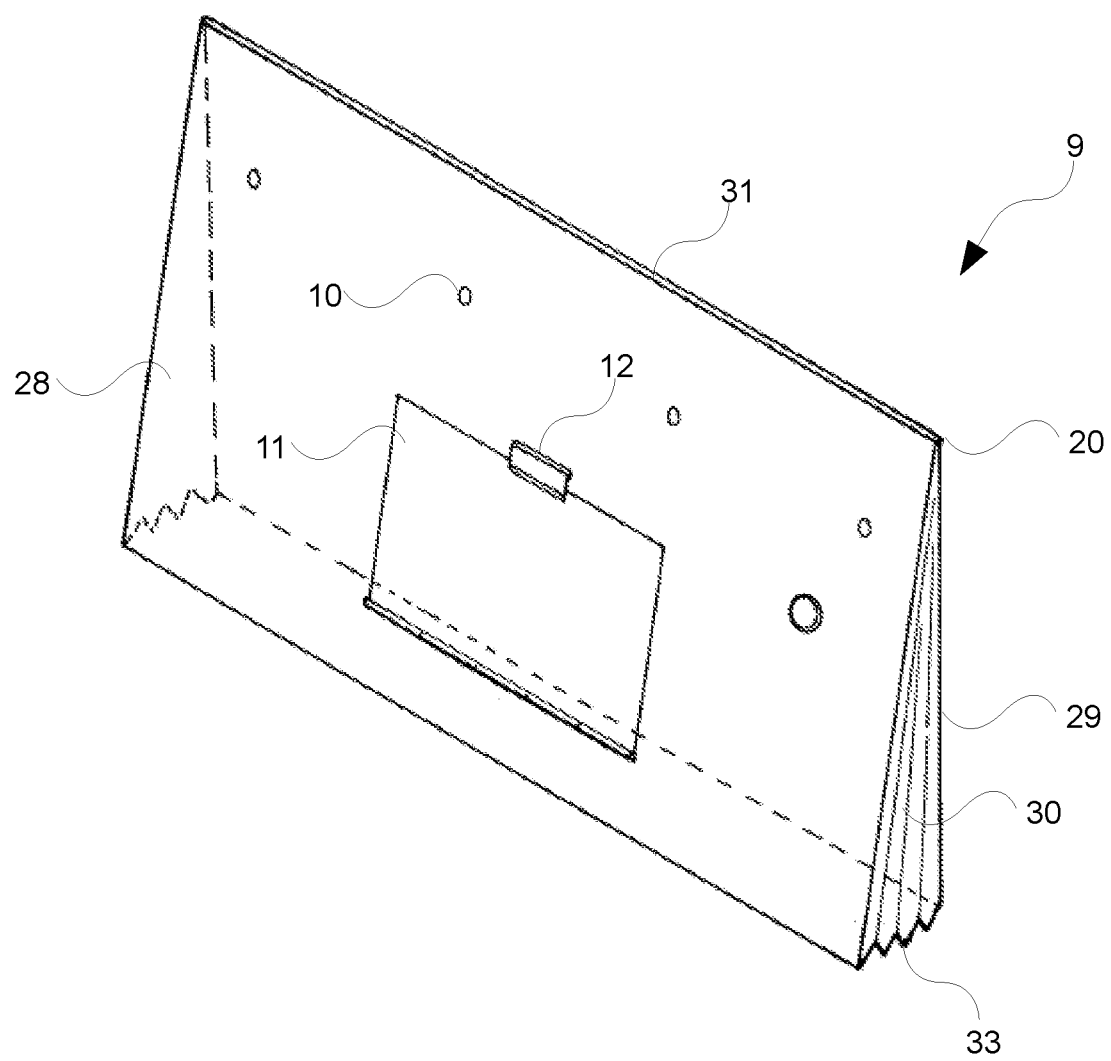
FIGS. 10-12 show a powdered chemical applicator in accordance with a second embodiment.

Turning now to FIG. 10, there is shown the chemical applicator 9 in accordance with a second embodiment. As will become apparent from the ensuing description, the chemical applicator 2 is configured for dispensing powdered chemicals. Similarly, such powdered chemicals may serve different purposes, such as by comprising pesticide, deodorising, marking properties and the like.

Now, in the embodiment shown, 9, the chemical applicator 9 comprises a substantially wedge shaped body 20 having a planar front 28 and rear 29, sides 30 therebetween and a base 33 and wherein the sides are substantially triangular such that the planar front 28 and rear 29 converge at a top edge 31 and are spaced apart at an opposite end thereof by the planar base 33 so as to define a powdered chemical reservoir therebetween.

The applicator 9 is to be adhered to the pet door 8 with the top edge 31 at the top such that the applicator presents a ramped profile devoid of substantial edges of protrusions that may strike the pet or snag a collar of the pet as the pet brushes past the applicator from the top to the bottom of the applicator.

Furthermore, the wedge shape of the applicator 19 comprises greater volume towards the bottom so as to allow the powder to settle at the bottom thereof.

Furthermore, the front 28 comprises at least one vent 10 located towards the top edge 31 such that, in use, as the pet door 8 is deflected by a pet, the powdered chemical is jostled within the reservoir so as to become airborne such that some of the airborne powdered chemical escapes through the at least one vent 10 onto the pet.

In a preferred embodiment as shown in FIG. 10, the vents 10 are located towards the upper edge 31 of the applicator 9 so as to be located to eject the airborne powder at the upper portion of the interior volume of the applicator 9 as opposed to the settled powder 15 settled at the bottom of the interior volume of the applicator 9.

In the embodiment shown, the applicator 9 comprises a plurality of vents 10 in a row in line with the top edge 10.

In a further preferred embodiment, the body 20 is configured to pressurise when force is applied to the front 28 as the pet comes into contact with the applicator 9 so as to force powdered aerosol from the applicator 9 through the vents 10 to powder the pet.

Specifically, as is substantially shown in FIG. 11 the body 20 is configured to assume a non-compressed configuration as is substantially shown in FIG. 11A and a compressed configuration as a substantially shown in FIG. 11B.

As can be seen, in the non-compressed configuration, the powdered chemical 15 settles at the bottom of the interior volume of the applicator 9.

The body 20 is configured to assume the compressed configuration when the pet presses against the front 28 body 20. Specifically, as the pet brushes against the front 28 of the applicator 9, the applicator 9 bends about the top edge 31 (the top edge 31 acting as a live hinge) such that the front 28 moves towards the rear 29 such that the interior volume of the applicator 9 decreases so as to force some of the powdered chemical through the vents in aerosol form 16.

As alluded to above, when initially striking the applicator 9, the powdered chemical 15 resting within the bottom interior of the applicator 9 may become jostled so as to be airborne within the interior of the applicator 9 so as to then be projected from the vents 10 when the applicator 9 is compressed.

So as to assist the compressibility of the applicator 9, as can be seen at least from the embodiment shown in FIG. 10, the base 33 and the sides 30 may be deformable, such as by being concertinaed.

The concertina lines of the base 33 may run in parallel along the length of the base 33. The concertina lines of the sides 30 may converge at the top edge 31.

In embodiments, the applicator 9 may comprise a replenishment door 11 which may be removed to replenish the powder within the applicator 9. In the embodiment shown, the door 11 may be coupled to the body 20 of the applicator 9 by way of a hinged, such as a live hinge. The opposite edge of the door 11 may be fastened by way of faster 12.

Turning now to FIG. 12, there is shown an exemplary use case scenario of a cat exiting the pet door 11 to which the chemical applicator 9 has been fastened by way of adhesion means 6, such as by way of double sided tape.

Specifically, as can be seen, the chemical applicator 9 formerly assumes the non-compressed configuration 17 as is shown in dotted lines. However, as the forehead of the cat strikes the applicator 9, the sides 30 and base 33 deforms such that the chemical applicator 9 takes the compressed configuration 18 as substantially shown in solid lines, thus forcing powdered aerosol 16 from the applicator 9 on the neck of the cat.

Third Embodiment—Liquid Chemical Applicator

Turning now to FIG. 13, there is shown the chemical applicator 19 in accordance with a third embodiment 19 wherein the applicator 19 is suited for applying liquid chemicals. Specifically, the chemical containing and applicator means comprises a liquid reservoir 27 and a wick 21. The wick 21 is configured to draw the liquid chemical 28 from the reservoir and smear the chemical on the pet.

Now, in the embodiment shown in FIG. 8, the applicator 19 comprises a substantially wedge-shaped body 20.

Specifically, the body 20 having a planar front 28 and rear 29, sides 30 therebetween and a planar base 33. As can be seen the sides 30 are substantially triangular such that the planar front and rear converge at a top edge 31 and are spaced apart at an opposite end thereof by the planar base so as to define the liquid reservoir 27 for holding the liquid chemical 26 therein.

The applicator 19 is to be adhered to the flap 8 in the orientation substantially shown in FIG. 8A such that the top edge 31 provides a smooth ramped transition (i.e. without a step) from the surface of the deflectable flap 8 to the front 28 of the applicator 19 such that the pet does not strike any hard edges such as were the body 20 substantially cube shaped or the like.

Specifically, as the pet strikes the applicator 19 and/or the door 8, the door 8 would be deflected such that the applicator 19 moves across the pet from the top to the bottom of the applicator 19 in accordance with the orientation substantially shown in FIG. 13A.

As can be appreciated, the smooth ramped transition between the flat 8 and the top edge 31 and that of the wedge shape of the body 20 of the applicator 19 is devoid of protrusions which may strike the pet causing discomfort or which may be snagged by collars for the like.

Furthermore, the wedge shape of the applicator 19 advantages to comprises greater volume towards the bottom so as to allow the liquid to pool at the bottom thereof.

Furthermore, the front 28 of the applicator 19 comprises an elongate slit 23 through which wick 21. The wick 21 protrudes along the length of the slit 23 such that no gaps of the slit 23 are exposed through which liquid chemical 26 may inadvertently leak, especially considering that the applicator 19 may transition through substantially 90° or more when the pet door 8 is deflected.

Furthermore, as can be seen, the slit 23 may be located towards the top edge 31 and especially preferably above the surface of the liquid chemical 26.

Figures 13A, 13B:
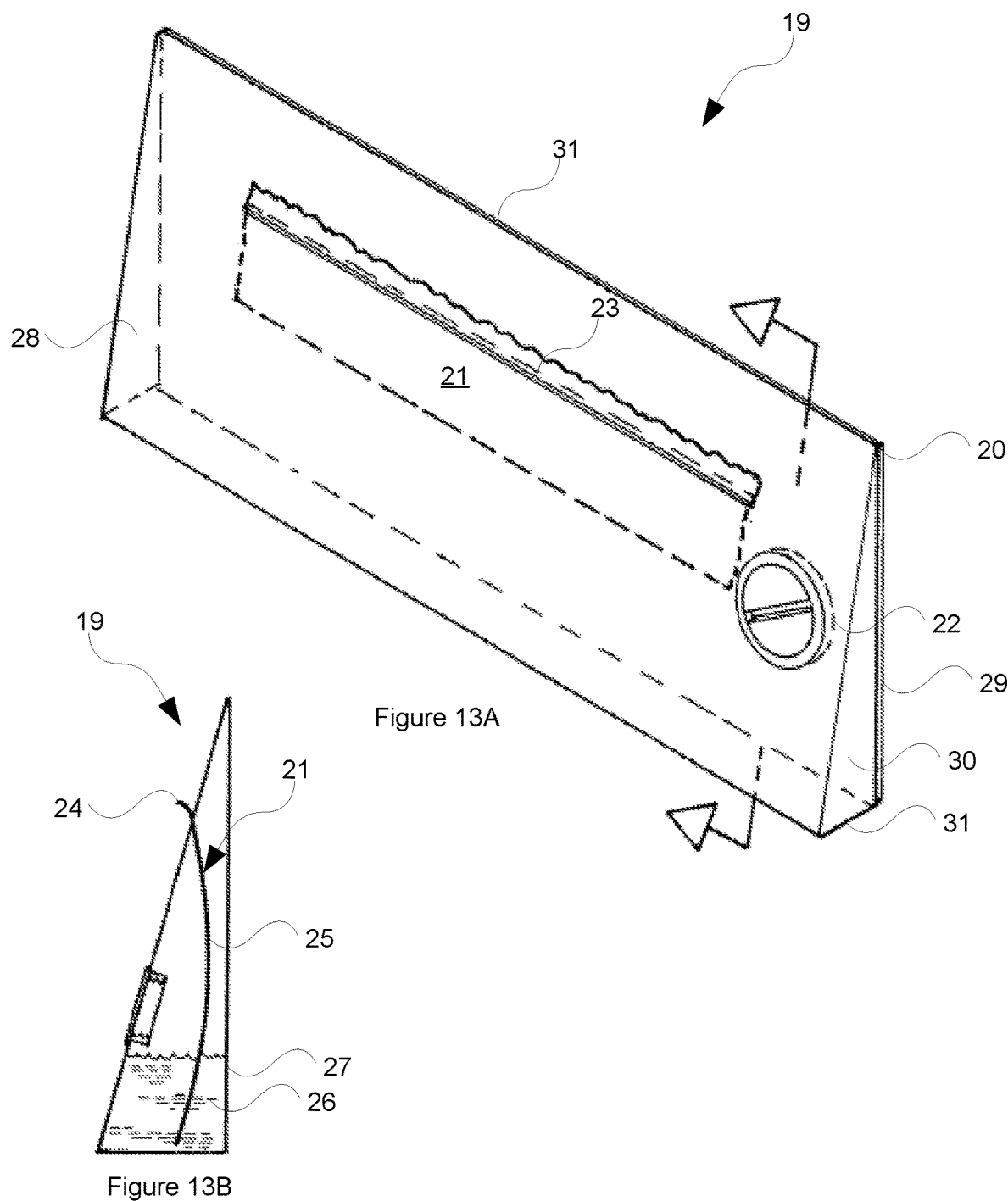
FIGS. 13-16 show a liquid chemical applicator in accordance with a second embodiment.

As is further shown in the cross-sectional view of FIG. 13B, the wick 21 transitions through the slit 23 so as to define a chemical application portion 24 and an interior portion 25.

In embodiments, the interior wick portion 25 dips into the liquid chemical 26 so as to draw the chemical up the wick 21 so as to wet the chemical application portion 24. In this embodiment, the wick 21 may be located and lengthened such that the lower edge of the wick 21 reaches the base 33.

In alternative embodiments, the wick 21 need not necessarily dip into the liquid chemical 26 wherein, as is substantially shown in FIG. 8A, the wick 21 is shortened but wherein, as the applicator 19 is jostled when the pet door 8 is deflected, the liquid chemical 26 splashes across the interior portion 25 of the wick 21.

In the embodiment shown in FIG. 8B, the chemical application portion 24 is left naturally extending from the slit 23 which is then deflected as the pet hide moves across the front 28 of the applicator 19.

However, in other embodiments, the chemical application portion 24 lies across at least a portion of the surface of the front 28 of the applicator 19. For example, given the orientation shown in FIG. 9B, the application portion 24 may be folded downwardly and, in embodiments, adhered to the surface of the front 28 so as to define a substantially rectangular chemical application portion 24. In embodiments, when folded over in this manner, the chemical application portion 24 may be backed by sponge or the like such that the chemical application portion 24 is padded.

In embodiments, the applicator 19 may be refilled and, in this embodiment, the applicator 19 may comprise refill aperture 22 and cooperating stopper, being a screw type stopper in this embodiment. As such, in use, the pet owner may remove the stopper and refill the liquid chemical 26 via the refill aperture 22. Ideally, the refill aperture 22 is located towards the top edge 31 such that the applicator 19 may be refilled in place to a certain level, such as that which is substantially shown in FIG. 8B.

In embodiments, the body 20 may be seethrough such that the extent of the level of the liquid chemical 26 within the reservoir 27 is visually apparent. Furthermore, level markings may be provided so as to guide the user as to the appropriate level for filling or for the appropriate level where dilution is required, for example.

In embodiments, the applicator 19 may comprise separate reservoirs 26 separated by internal walls and wherein each separate reservoir 26 comprises a separate wick 21 such that differing types of chemicals may be applied simultaneously. In one embodiment, the separate reservoirs 26 are widthwise adjacent from the front of the applicator 19 being divided by a dividing wall conforming substantially in shape and configuration as that of the sides 30.

However, in other embodiments, the separate reservoirs 26 may be depthwise adjacent from the front of the applicator 19 being separated by an interior dividing wall having a shape conforming substantially to that of the front 28 or rear 29 of the applicator 19. In this embodiment, the wick 21 associated with the rearward separate reservoir 26 may extend through a slit 23 located above another slit 23 for a wick 21 of the forward separate reservoir 26.

Figure 14A:
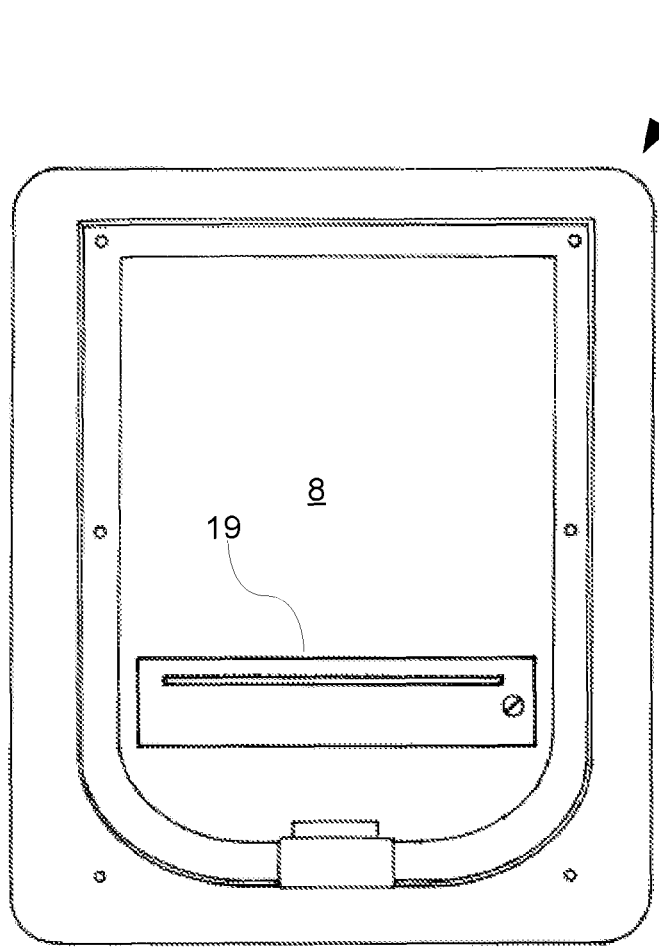

Turning now to FIG. 14, there is shown embodiments of the door 1 to which the applicator 19 has been fastened by way of adhesion means 6, such a double sided tape, hook and loop fastener, fasteners or the like. Specifically, FIG. 14A shows a front view of the door 1 wherein, similarly, the applicator 19 has been located towards the lower edge of the deflectable flap 8.

Figure 14B:
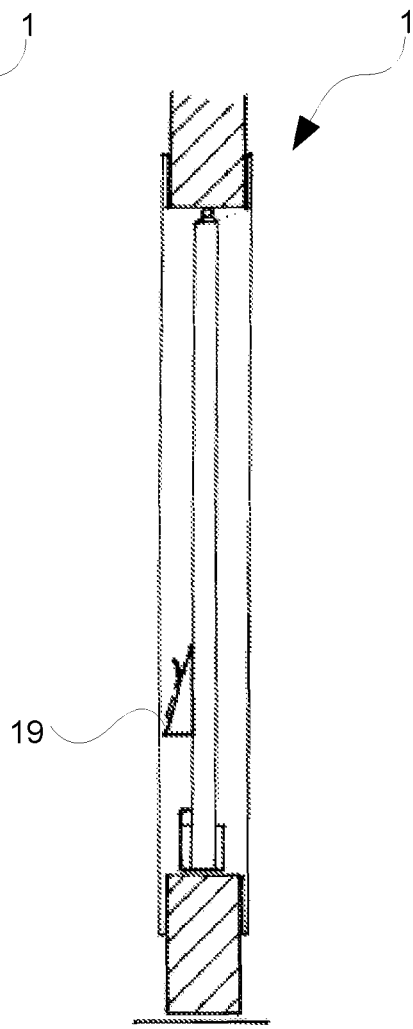

FIG. 14B shows the corresponding position of the applicator 19 by way of a side view of the door 1.

As can be seen, and is alluded to above, the wedge shape of the applicator 19 is ramped in the direction of motion of the pet with respect to the applicator 19 and is therefore devoid of sharp edges, protrusions or the like which may hurt or harm the pet or may snag the collar of the pet.

Figure 15:
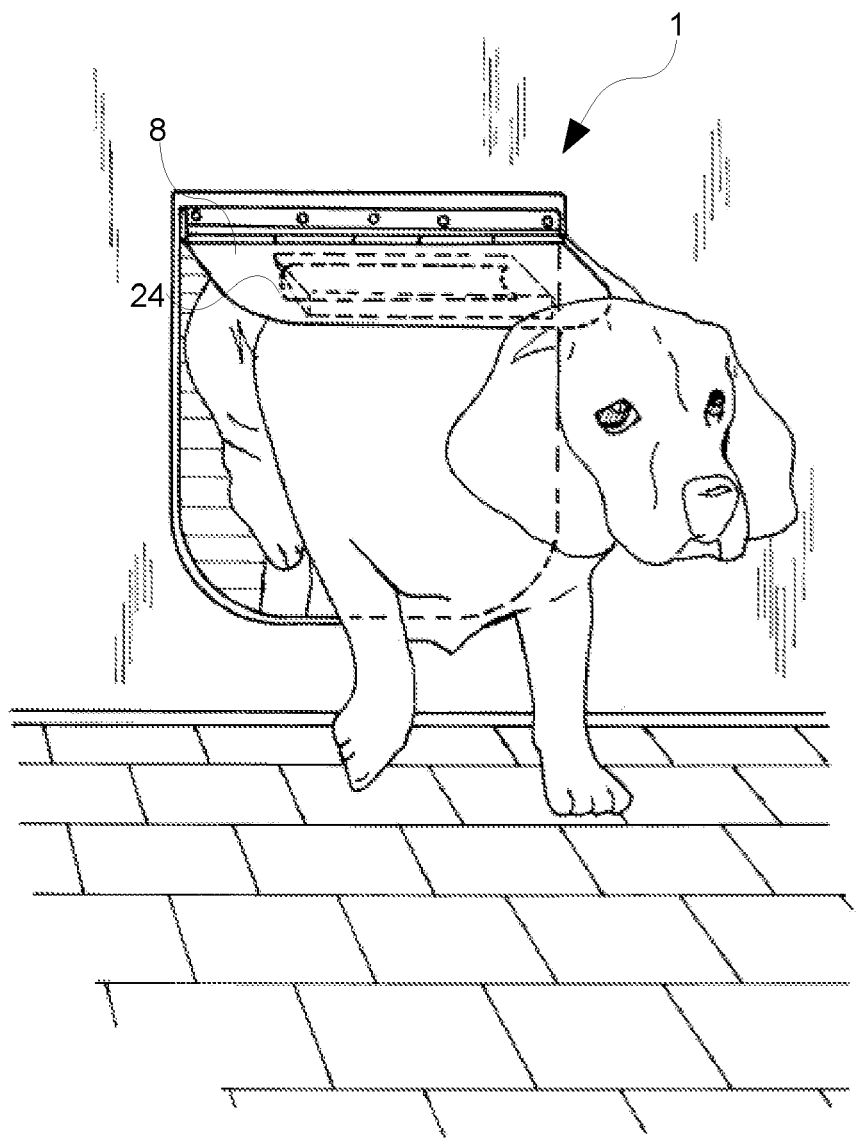
Figure 16:
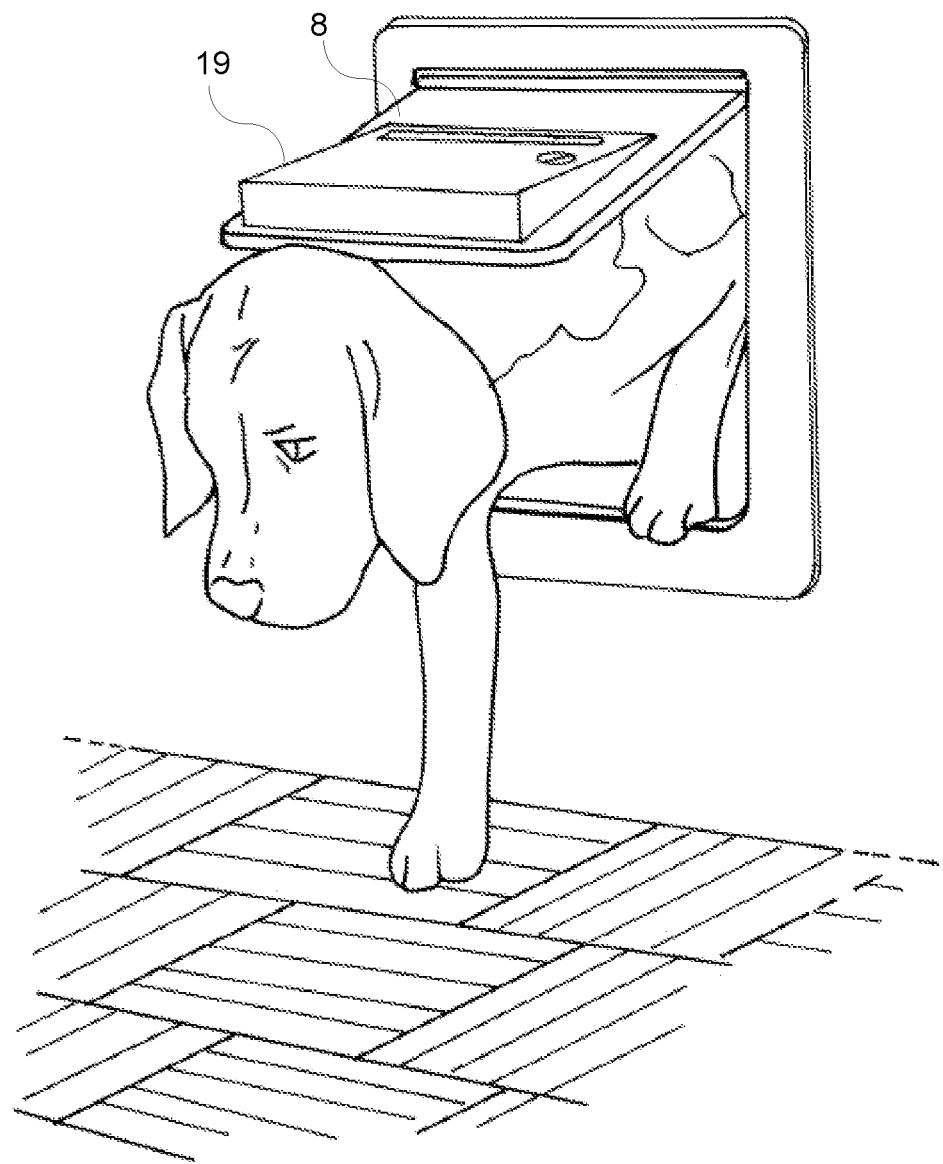

Turning now to FIG. 15, there is shown an in-use embodiment of the applicator 19 wherein the applicator 19 is used for applying a chemical across the spine of a dog.

Specifically, as can be seen, the dog exits via the pet door 1, and, in doing so, deflects the deflectable flap 8 upwards to which the applicator 19 has been fastened. In embodiments, the applicator 19 is fastened to the interior side of the deflectable flap 8 so as to protect the applicator 19 from exterior elements, such as rain, dust and the like.

Now, as the dog passes through the door 1, the applicator 19 makes contact with the pet such that the chemical application portion 24 of the wick 21 drags across the nose, forehead and spine of the dog applying the liquid chemical.

Figure 11A:
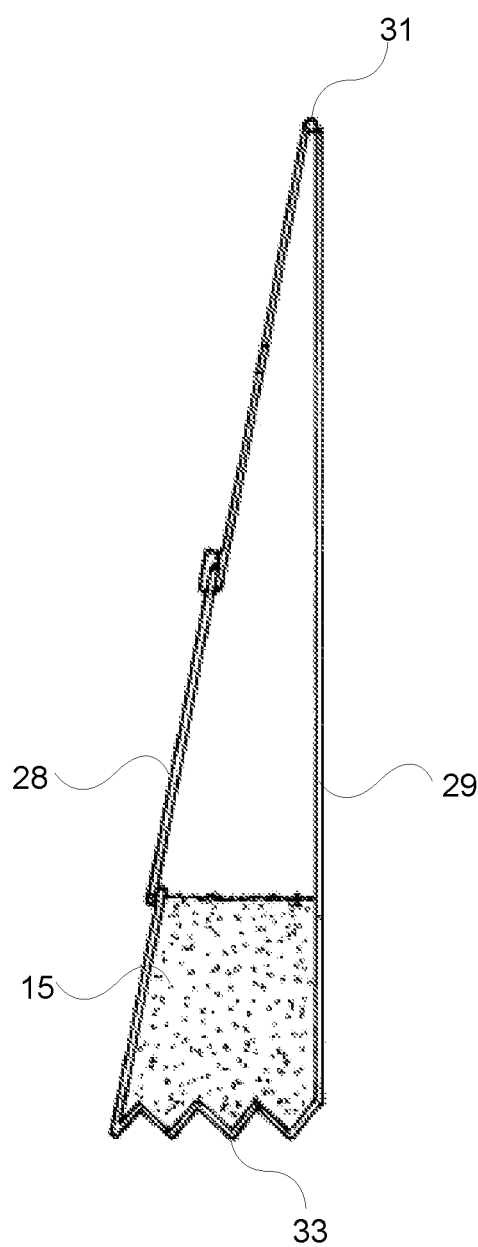
Figure 11B:
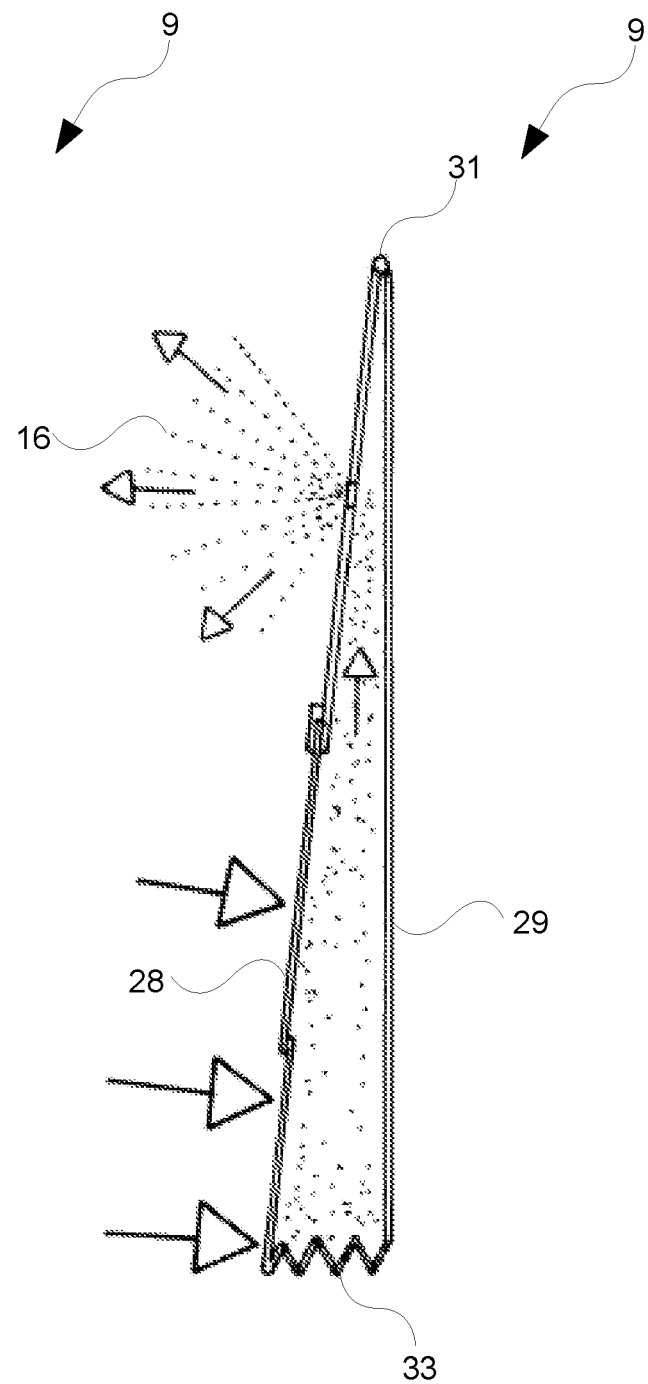
Figure 12:
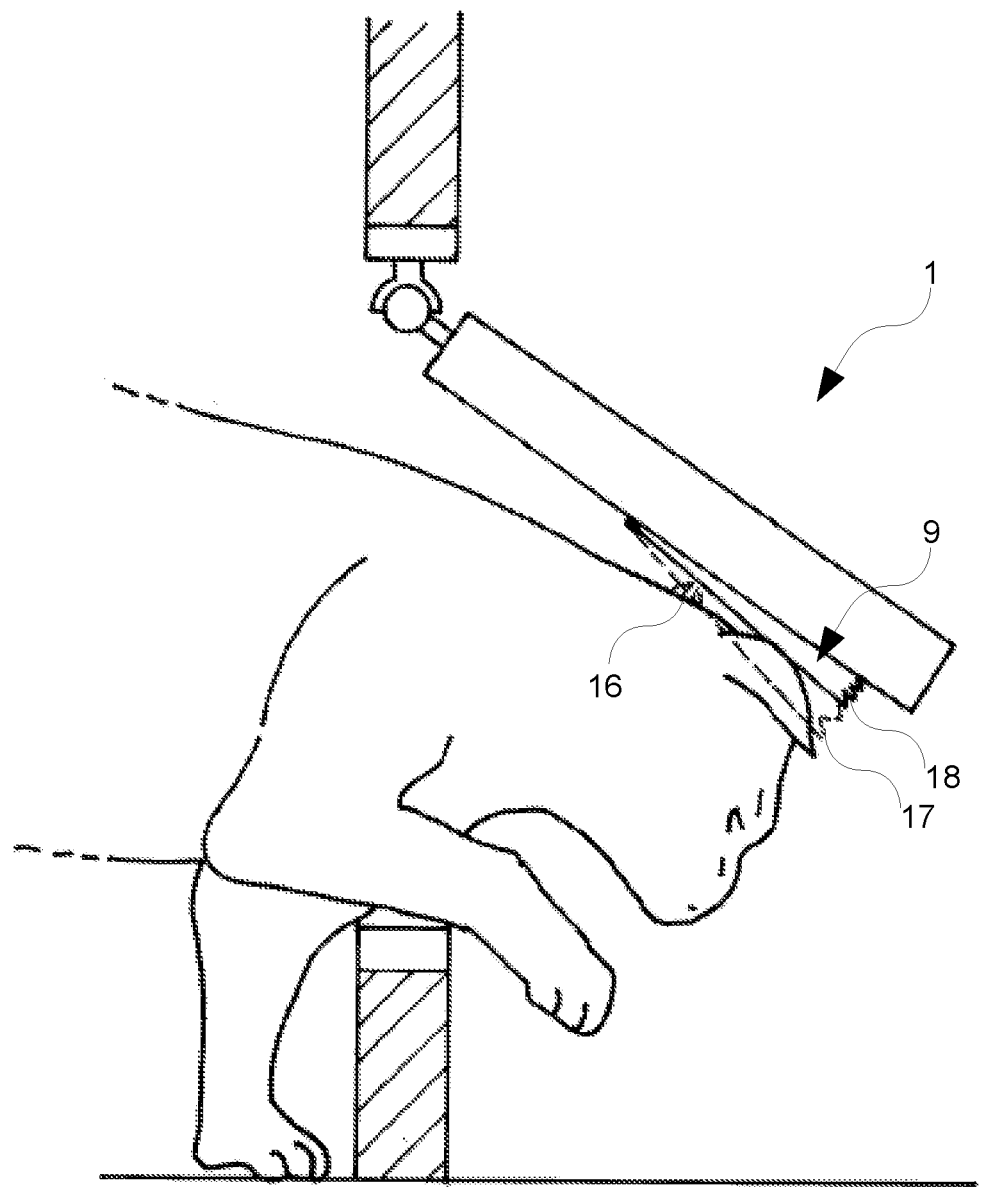

FIG. 11 simply shows the dog re-entering the door 8 wherein, as can be seen, the location of the applicator 19 on the opposite side of the deflectable flap 8 does not substantially hinder the opening of the deflectable flap 8 inwards. In embodiments, the applicator 19 may be provided on both sides of the flap 18 so as to increase the chemical dosage or so as to be used for applying differing chemicals.

Other Embodiments

It should be noted that while preferred embodiments have been described herein with regards to the applicator 2, 9 and 19 being utilised in conjunction with pet doors 1, it should be appreciated that the chemical applicators 2, 9 and 19 may be utilised in other manners and applications within the purposive scope of the embodiments described herein.

Specifically, in one embodiment, the applicators may be utilised for farm animals, such as by way of dosing sheep, cattle and the like.

For example, for dosing sheep, the applicator may be fastened to a lower edge of a rail above a feeding trough or the like. In this manner, as the sheep feed from the feeding trough, the neck of the sheep makes contact with the applicator fastened to the rail above thereby applying the chemical to the sheep.

Chemicals may similarly applied to cattle in this manner. In further embodiments, applicators may be provided on vertical surfaces, such as posts, panels and the like such that domestic animals, such as cattle make contact with the applicators as they pass.

In embodiments, and as alluded to above, the applicators may comprise markers such that farmers may ascertain which animals have been dosed. For example, where the applicator has been applied to a vertical post, such as in a passageway or the like, those cattle having made contact with the applicator and received a chemical dosing may similarly be marked, such as with a coloured liquid chemical or chalk like substance such that the dosage may be visually ascertained by the farmer.

Interpretation

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the pet, husbandry and poultry industries.

The invention claimed is:

1. A liquid chemical applicator for a pet door, the pet door movable between an at rest position without any external force acting on the pet door, and a use position, where a pet provides a force against the pet door, the applicator comprising:
    a substantially wedge shaped body having a planar front and rear, sides therebetween and a base and wherein the sides are substantially triangular such that the planar front and rear converge at a top edge and are spaced apart at a lower opposite end thereof by the planar base so as to define a liquid chemical reservoir therebetween; and
    an adhesion means on a rear of the chemical applicator for adhering the chemical applicator
    to the pet door orientated with the top edge at the top thereof such that the applicator presents a ramped transition to the surface of the pet door above the chemical applicator when the applicator is applied to the pet door, wherein;

the front comprises a lengthwise slit having a planar wick therethrough and therealong, the wick extending through the slit so as to define an interior portion for being soaked by the liquid chemical within the reservoir and an exterior chemical application portion, wherein, in use, as the pet brushes past the pet door the chemical application portion rubs across the hide of the pet applying the liquid chemical thereon; and when the liquid chemical is filled to a level adjacent a fill port of the liquid chemical reservoir, the slit is located above a surface level of the liquid chemical when the pet door is in the at rest position and the applicator is applied to the pet door.

2. The liquid chemical applicator as claimed in claim 1, wherein the interior portion is sufficiently lengthened to dip into the liquid chemical when the applicator is in an upright orientation.

3. The liquid chemical applicator as claimed in claim 1, wherein the interior portion lies above a surface of the liquid chemical and wherein the liquid chemical splashes across the interior portion when the pet door is deflected.

4. The liquid chemical applicator as claimed in claim 1, wherein the wick has sufficient width to occupy the entire length of the slit.

5. The liquid chemical applicator as claimed in claim 1, wherein the body is substantially transparent for inspecting a surface level of the liquid chemical.

6. The liquid chemical applicator as claimed in claim 1, wherein the fill port allows for refilling the liquid chemical reservoir.

7. The liquid chemical applicator as claimed in claim 6 wherein the fill port is located towards the top edge.

8. The liquid chemical applicator as claimed in claim 6, further comprising a screw cap for sealing the fill port.

9. An applicator pet door comprising a chemical applicator as claimed in claim 1.

10. A method of using the chemical applicator as claimed in claim 1, comprising applying the chemical applicator to the pet door, placing the liquid chemical in the liquid chemical reservoir, and causing the pet to move through the pet door.

* * * * *